(12) United States Patent
Kim et al.

(10) Patent No.: US 12,266,200 B2
(45) Date of Patent: Apr. 1, 2025

(54) ELECTRONIC DEVICE AND HANDWRITING RECOGNITION METHOD

(71) Applicant: Samsung Electronics Co., Ltd., Gyeonggi-do (KR)

(72) Inventors: Jihoon Kim, Gyeonggi-do (KR); Gwanyong Park, Gyeonggi-do (KR); Jeongwan Park, Gyeonggi-do (KR); Donghyuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/875,605

(22) Filed: Jul. 28, 2022

(65) Prior Publication Data

US 2023/0046860 A1 Feb. 16, 2023

Related U.S. Application Data

(63) Continuation of application No. PCT/KR2022/008797, filed on Jun. 21, 2022.

(30) Foreign Application Priority Data

Jul. 28, 2021 (KR) ........................ 10-2021-0099154

(51) Int. Cl.
*G06F 3/04883* (2022.01)
*G06V 30/19* (2022.01)
(Continued)

(52) U.S. Cl.
CPC .......... *G06V 30/36* (2022.01); *G06F 3/04883* (2013.01); *G06V 30/19093* (2022.01); *G06V 30/22* (2022.01); *G06V 30/347* (2022.01)

(58) Field of Classification Search
CPC .. G06V 30/36; G06V 30/19093; G06V 30/22; G06V 30/347; G06V 30/1423;
(Continued)

(56) References Cited

U.S. PATENT DOCUMENTS

| | | |
|---|---|---|
| 6,188,789 B1 * | 2/2001 | Marianetti, II .... G06V 30/1444 382/189 |
| 7,013,046 B2 | 3/2006 | Kawamura et al. |

(Continued)

FOREIGN PATENT DOCUMENTS

| | | |
|---|---|---|
| KR | 10-1182713 B1 | 9/2012 |
| KR | 10-1361063 B1 | 2/2014 |

(Continued)

OTHER PUBLICATIONS

International Search Report dated Sep. 29, 2022.
Extended European Search Report dated Oct. 11, 2024.

*Primary Examiner* — Phuong H Nguyen
(74) *Attorney, Agent, or Firm* — Cha & Reiter, LLC

(57) ABSTRACT

According to certain embodiments, an electronic device may include a display, a memory, and a processor operatively connected to the display and the memory. The processor may be configured to, while receiving user's touch input in a handwriting area of the display, the user's touch input comprising successive input stokes: output the successive input strokes in the handwriting area on the display; determine a first stroke group including some of the successive input strokes, to determine a first character corresponding to the first stroke group, to output the first stroke group in an output area adjacent to the handwriting area on the display, to determine a second stroke group including at least another input stroke received after the some of the successive input strokes, to determine a second character corresponding to the second stroke group, and to output the second stroke group in the output area, move the first stroke group to on one side of the second stroke group on the display.

20 Claims, 13 Drawing Sheets

(51) Int. Cl.
G06V 30/22 (2022.01)
G06V 30/32 (2022.01)

(58) Field of Classification Search
CPC ............. G06V 30/373; G06V 30/2264; G06V 2201/02; G06F 3/04883; G06F 3/0488; G06F 3/03545; G06F 3/0383
See application file for complete search history.

(56) References Cited

U.S. PATENT DOCUMENTS

| | | | |
|---|---|---|---|
| 8,175,389 B2 | 5/2012 | Matic et al. | |
| 9,323,456 B2 | 4/2016 | Zhen et al. | |
| 9,524,440 B2 | 12/2016 | Wimmer et al. | |
| 9,881,224 B2 | 1/2018 | Kienzle et al. | |
| 9,911,052 B2 | 3/2018 | Wimmer et al. | |
| 10,007,859 B2 | 6/2018 | Wimmer et al. | |
| 10,032,071 B2 | 7/2018 | VanBlon et al. | |
| 10,228,846 B2 | 3/2019 | Dixon et al. | |
| 10,649,647 B2 | 5/2020 | Lee et al. | |
| 2002/0009226 A1* | 1/2002 | Nakao | G06V 30/1423 382/177 |
| 2008/0008387 A1* | 1/2008 | Cheng | G06V 30/36 382/185 |
| 2008/0240569 A1 | 10/2008 | Tonouchi | |
| 2014/0015780 A1* | 1/2014 | Kim | G06F 16/9554 345/173 |
| 2015/0062043 A1 | 3/2015 | Kim et al. | |
| 2016/0147437 A1* | 5/2016 | Tsutsui | G06F 3/0236 715/268 |
| 2020/0257899 A1* | 8/2020 | Dixon | G06F 18/21 |

FOREIGN PATENT DOCUMENTS

| | | |
|---|---|---|
| KR | 10-2015-0027885 A | 3/2015 |
| KR | 10-2016-0062565 A | 6/2016 |
| KR | 10-2017-0005378 A | 1/2017 |
| KR | 10-2019-0052667 A | 5/2019 |
| KR | 10-1989960 B1 | 6/2019 |
| KR | 10-2021-0017090 A | 2/2021 |

\* cited by examiner

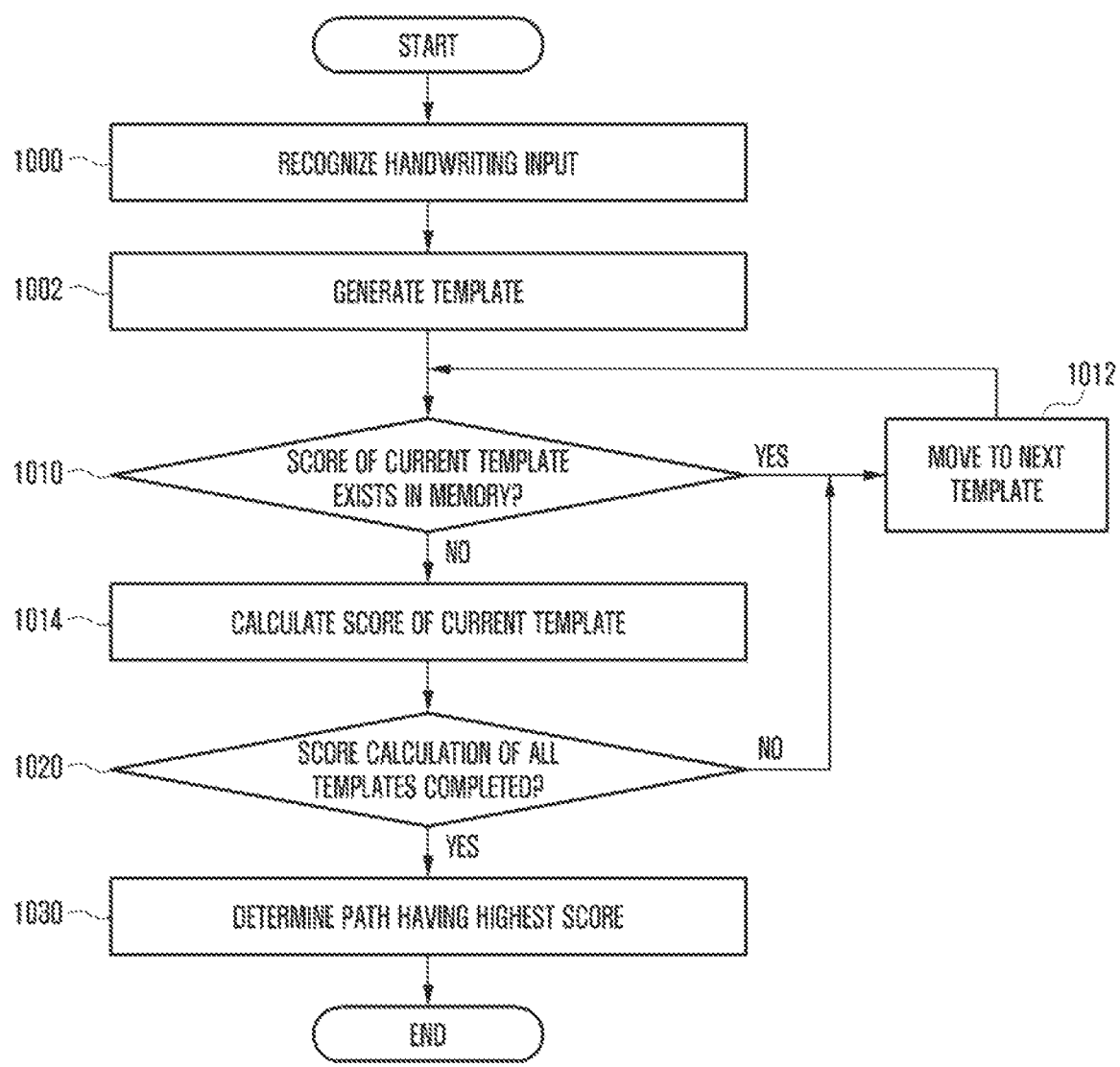

ELECTRONIC DEVICE AND HANDWRITING RECOGNITION METHOD

CROSS-REFERENCE TO RELATED APPLICATION(S)

This application is a continuation of International Application No. PCT/KR2022/008797, filed on Jun. 21, 2022, which claims priority to Korean Patent Application No. 10-2021-0099154, filed on Jul. 28, 2021 in the Korean Intellectual Property Office, the disclosures of which are herein incorporated by reference.

TECHNICAL FIELD

Certain embodiments of the disclosure relate to an electronic device and a method of recognizing handwriting, for example, overwriting, by using the electronic device.

BACKGROUND

Many electronic devices, such as tablets and smartphones include touch screens. The touch screen is a device that detects a touch input of various pointing devices (e.g., a finger, a stylus, a touch pad, a pen mouse, or an air mouse) on a display to enable an interface between an electronic device and a user. As the use of portable devices increases, various input techniques using the touch screen are introduced. The touch screen is widely used in various devices and various fields. The touch screen may be used in a soft input panel (SIP) application, and the electronic device may convert a handwriting input into text and match characters of the converted text with an input stroke.

The electronic device may recognize a stroke corresponding to a touch input and display it on the display. For example, the electronic device may recognize handwriting input data in which multiple characters are overwritten on a limited screen, and separate the overwritten characters to be displayed on the display.

Allowing handwriting input using a pen (or finger) where handwriting is entered while the hand moves from left to right (or from right to left) has shortcomings. For example, there may be noise at the fingertip or the pen tip due to some contact of the palm. Accordingly, errors may occur in handwriting input due to such noise. Additionally, when the touch screen has a limited size, such as in portable electronic device, handwriting is restricted.

A situation called overwriting occurs when handwritten input data is overlapped in successive strokes. Accordingly, it is necessary to distinguish characters by using less information in a process for separating characters. Therefore, it is required to introduce a more efficient operation method to recognize overwriting.

SUMMARY

Certain embodiments of the disclosure are intended to provide a method of distinctively recognizing overlap strokes inputted in the same area when the electronic device recognizes a handwriting input to a display as mentioned above.

According to certain embodiments, an electronic device comprises: a display; a memory; and a processor operatively connected to the display and the memory, wherein the processor is configured to: while receiving user's touch input in a handwriting area of the display, the user's touch input comprising successive input strokes: output the successive input strokes in the handwriting area on the display; determine a first stroke group including some of the successive input strokes; determine a first character corresponding to the first stroke group, output the first stroke group in an output area adjacent to the handwriting area on the display, determine a second stroke group including at least another input stroke received after the some of the successive input strokes, determine a second character corresponding to the second stroke group, and output the second stroke group in the output area; move the first stroke group to one side of the second stroke group on the display.

According to certain embodiments, a method for recognizing handwriting in an electronic device, the comprises: while receiving user's touch input in a handwriting area of a display, the user's touch input comprising successive input strokes: output the successive input strokes in the handwriting area on the display; determining a first stroke group including some of the successive input strokes; determining a first character corresponding to the first stroke group; outputting the first stroke group in an output area adjacent to the handwriting area on the display; determining a second stroke group including at least another input received after the some of the successive input strokes; determining a second character corresponding to the second stroke group; and outputting the second stroke group in the output area; move the first stroke group to one side of the second stroke group on the display.

According to certain embodiments, the electronic device may provide a method of allowing handwriting to be performed without movement of a hand on a touch screen. Through this, the electronic device may reduce handwriting errors caused by unintentional contact of a fingertip or pen tip. Also, even if the electronic device has a display of a relatively small size, the amount of handwriting may not be limited because input can be continued in the same area.

According to certain embodiments, the electronic device may improve a handwriting recognition speed by reducing unnecessary and repetitive operations in a process of internally deriving a result at a recognition engine.

In addition, effects obtainable or predicted from certain embodiments of the electronic device will be explicitly or implicitly disclosed in the detailed description of the embodiments. For example, various effects predicted from certain embodiments of the electronic device will be disclosed in the detailed description to be given later.

BRIEF DESCRIPTION OF DRAWINGS

FIG. 10 is a flow diagram illustrating a method for generating a character string candidate group with various templates and selecting an optimal path at an electronic device according to certain embodiments of the disclosure.

DETAILED DESCRIPTION

Hereinafter, certain embodiments of the disclosure will be described in detail with reference to the accompanying drawings.

In describing embodiments, descriptions of technical contents that are well known in the technical field to which the disclosure pertains and are not directly related to the disclosure will be omitted. In addition, redundant description of elements having substantially the same configuration and function will be omitted.

For the same reason, some elements are exaggerated, omitted, or schematically illustrated in the accompanying drawings. In addition, the depicted size of each element does not fully reflect the actual size. Therefore, the disclosure is not limited by a relative size or spacing depicted in the accompanying drawings.

Figure 1:
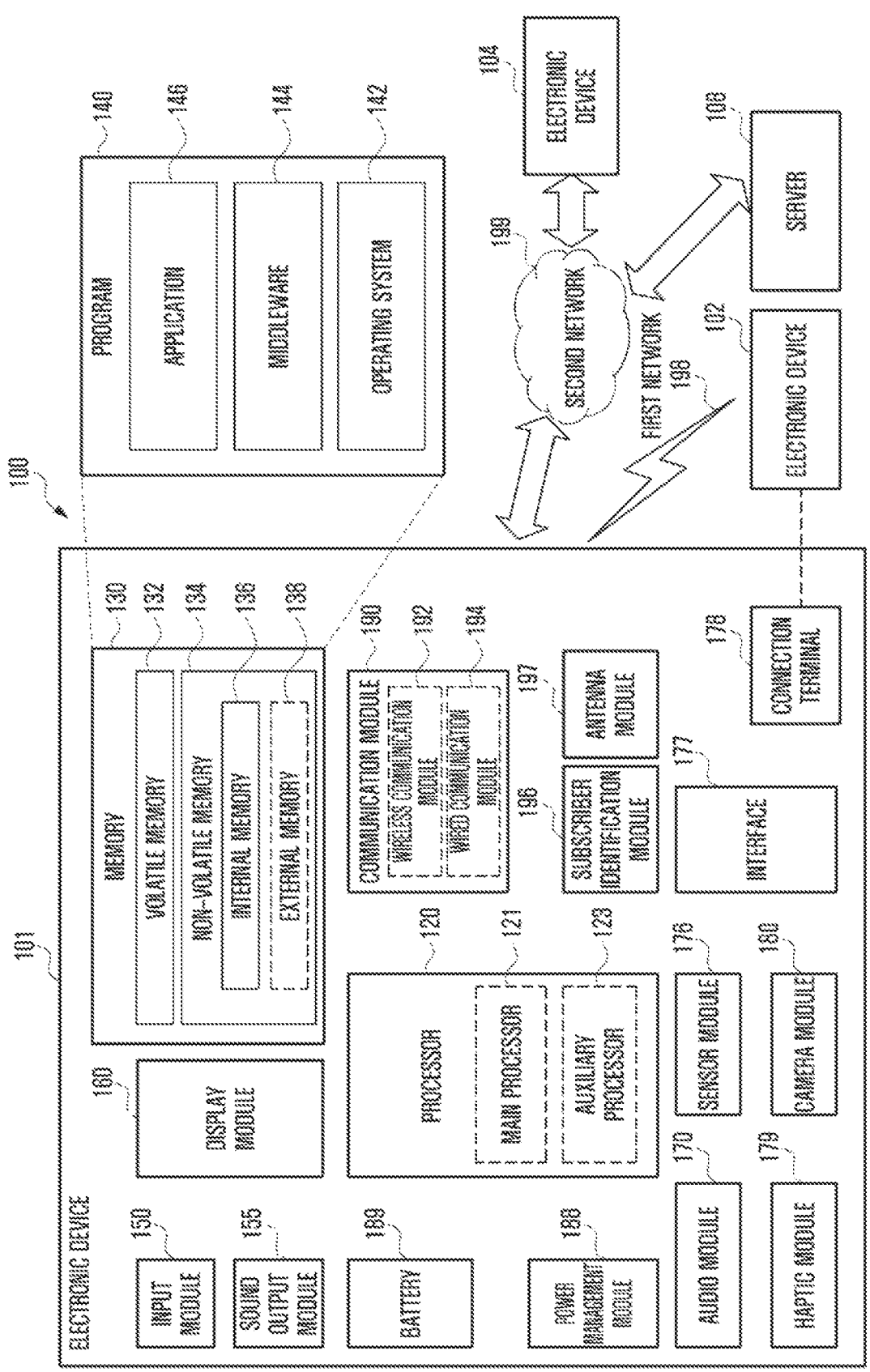
FIG. 1 is a block diagram illustrating an electronic device in a network environment according to certain embodiments of the disclosure.

FIG. 1 describes an electronic device 101. The electronic device 101 may be configured to receive handwritten input, through a touch screen overlaid on the display module 160.

In certain embodiments, the electronic device 101 may allow handwriting to be performed without movement of the hand on the touch screen. The foregoing reduces handwriting errors.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

"Processor" as used in this document shall refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

It shall be understood that subject matter involving a stylus include use of a finger and vice versa. Additionally, "touch input" shall include contact with a stylus.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added FIGS. 2A and 2B illustrate an operation of overwriting in an electronic device according to certain embodiments of the disclosure.

According to certain embodiments, the electronic device (e.g., the electronic device 101 in FIG. 1) may output a stroke based on a user's touch input to a display (e.g., the display module 160 in FIG. 1). The electronic device may detect a handwriting tool (e.g., a stylus) in contact with the display and output a stroke corresponding to a movement path of the handwriting tool. The handwriting tool may include various devices or tools such as an electronic pen and/or a finger. The handwriting tool may be diversified depending on devices related to an electronic handwriting function of the electronic device. For example, in relation to the support for a handwriting function of an electronic pen, the electronic device may include a touch panel or touch sheet employing at least one of various sensors such as a capacitive touch sensor, an electromagnetic induction touch sensor, or a resistive touch sensor. In relation to the support of a handwriting function of a finger, the electronic device may include a touch panel or touch sheet employing a capacitive touch sensor or a resistive touch sensor. Meanwhile, in electronic handwriting operation environments according to certain embodiments of the disclosure, the handwriting tool is not limited to the electronic pen or the finger. For example, as the handwriting tool, various tools such as a graphite pencil, a stick, or a gloved hand may be used. In certain embodiments of the disclosure, the handwriting tool should be understood as a tool capable of inputting handwriting on the display module of the electronic device.

Figure 2A:
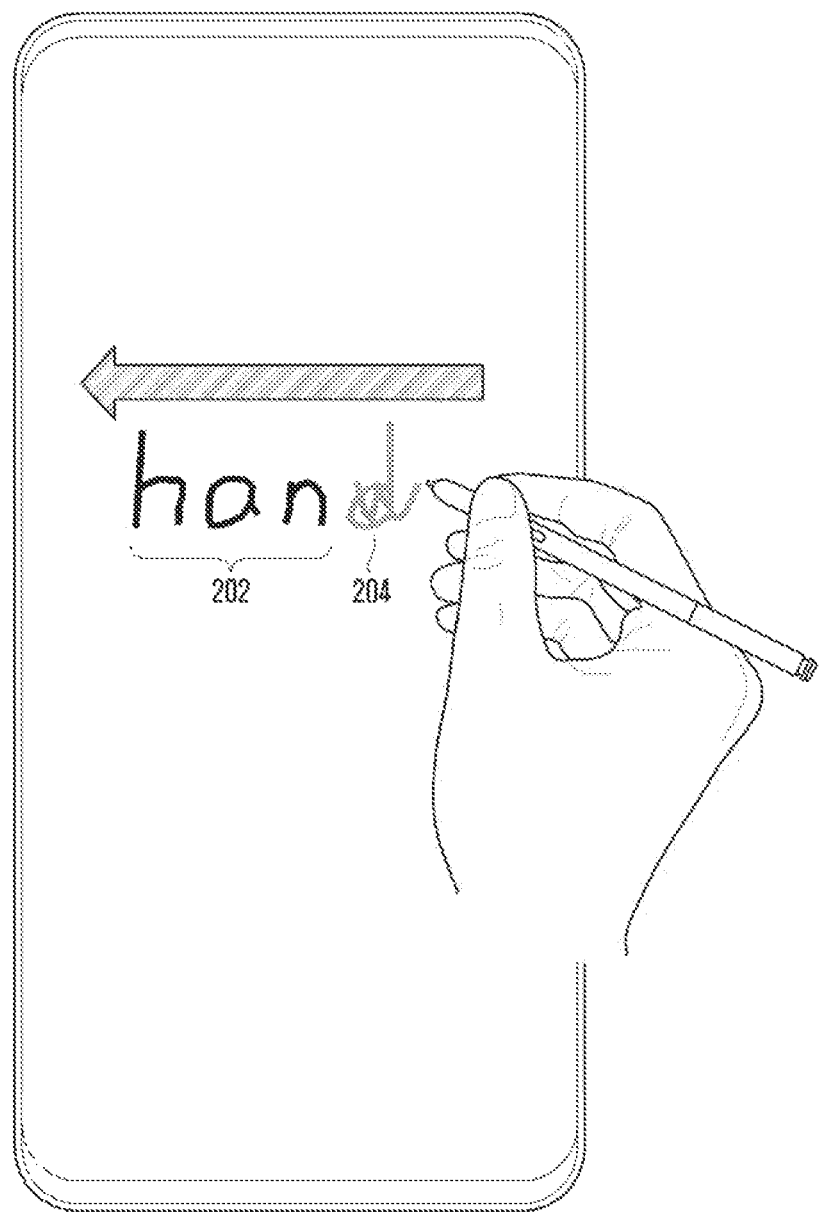
FIGS. 2A and 2B illustrate an operation of overwriting in an electronic device according to certain embodiments of the disclosure.
Figure 2B:
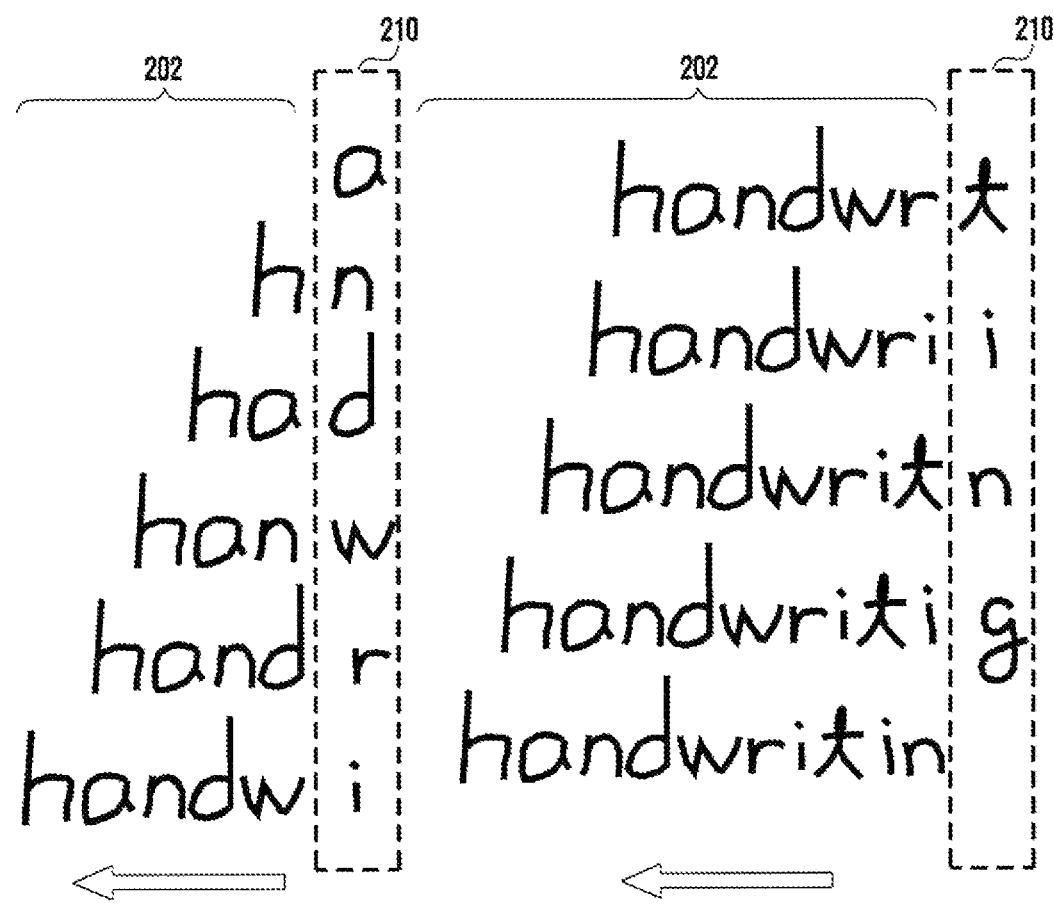

FIGS. 2A and 2B illustrate an operation of overwriting in an electronic device according to certain embodiments of the disclosure.

The electronic device (e.g., the electronic device 101 in FIG. 1) may output a stroke on the display (e.g., the display module 160) in response to a user's touch input to a touch screen overlaying the display. The electronic device may detect a handwriting tool (e.g., a stylus) in contact with the display and output a stroke corresponding to a movement path of the handwriting tool. The handwriting tool may include various devices or tools such as an electronic pen and/or a finger. The handwriting tool may be diversified depending on devices related to an electronic handwriting function of the electronic device. For example, in relation to the support for a handwriting function of an electronic pen, the electronic device may include a touch panel or touch sheet employing at least one of various sensors such as a capacitive touch sensor, an electromagnetic induction touch sensor, or a resistive touch sensor. In relation to the support of a handwriting function of a finger, the electronic device may include a touch panel or touch sheet employing a capacitive touch sensor or a resistive touch sensor. Meanwhile, in electronic handwriting operation environments according to certain embodiments of the disclosure, the handwriting tool is not limited to the electronic pen or the finger. For example, as the handwriting tool, various tools such as a graphite pencil, a stick, or a gloved hand may be used. In certain embodiments of the disclosure, the handwriting tool should be understood as a tool capable of inputting handwriting on the display module of the electronic device.

With reference to FIG. 2A, the electronic device (e.g., the electronic device 101) may receive a touch input to one area of the display. The electronic device 101 can determine a corresponding character, and output the character while the user moves a stroke in one direction. The user writes in area 204. As the user writes the letter, the strokes are displayed in screen area 204. When the user finishes writing the letter, all of the strokes forming the letter are moved to the left, thereby allowing the user to write another letter in area 204. The electronic device may use one area of the display as a handwriting area 204 (in FIG. 2A) or 210 (in FIG. 2B). The electronic device 101 can receive a user's touch input to the handwriting area 204 or 210, and output a stroke. The electronic device may determine another area of the display as an output area 202 and display a recognized stroke on the output area 202. That is, after the user has written the letter, the letter is moved to the left into area 202. Previous letters may also be moved to the left.

For example, when the user handwrites a word 'handwriting', the user may input characters such as 'h', 'a', 'n', 'd', and 'w' to the handwriting area 204 or 210 while sequentially overlapping them. The electronic device may determine a character corresponding to each stroke and display it in the output area 202 whenever a stroke is inputted. The electronic device may arrange the recognized characters from left to right (or from right to left) so that the user can easily read them. To this end, a character outputted first may be shifted to the left (or right) by one space, and the next character may be outputted. As a result, the user's writing is confined to a relatively smaller area of touch screen on the display 160.

FIG. 2B illustrates an operation of overwriting in the handwriting area 210. With reference to FIG. 2B, the electronic device (e.g., the electronic device 101) may receive a touch input to the handwriting area 210 and output the recognized stroke to the output area 202, by moving what was written in handwriting area 210 to the left to output area 202. For example, a processor (e.g., the processor 120 in FIG. 1) may recognize an input stroke corresponding to 'h' in the handwriting area 204 or 210, determine the corresponding character 'h', and output the stroke. The processor may recognize a subsequent input stroke and output the stroke corresponding to the next character 'a'. The input stroke and the output stroke may have the same shape. According to an embodiment, because there may exist a character composed of two or more strokes, the processor may recognize a plurality of strokes as a single character without recognizing one stroke as one character. A method for recognizing a plurality of strokes as a single character will be described in detail with reference to FIGS. 5 to 7.

Figure 3:
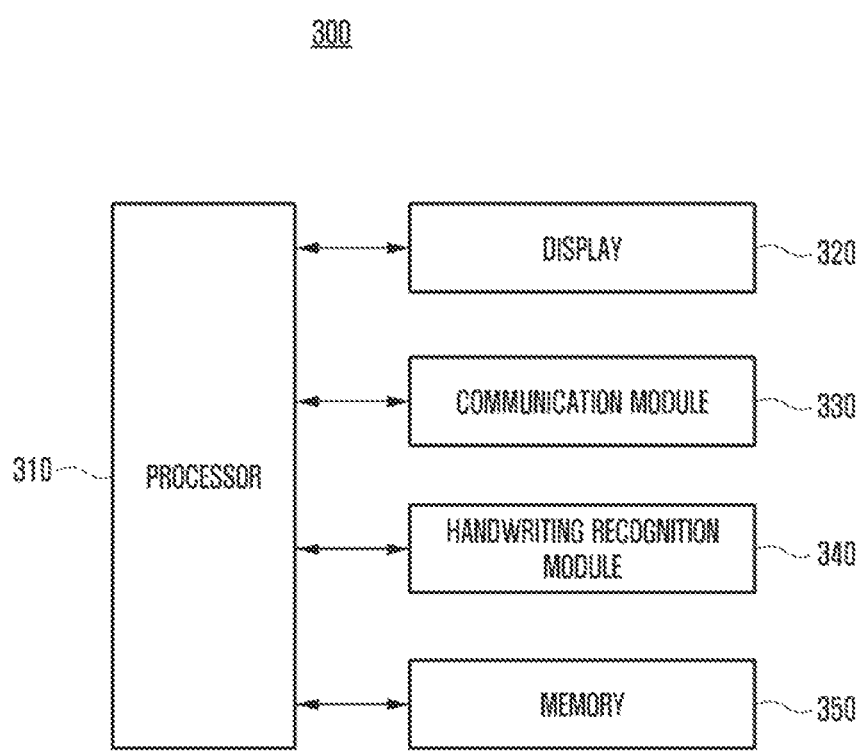
FIG. 3 is a block diagram illustrating an electronic device according to certain embodiments of the disclosure.

FIG. 3 is a block diagram illustrating an electronic device according to certain embodiments of the disclosure.

With reference to FIG. 3, the electronic device 300 may include a display 320, a communication module 330, a handwriting recognition module 340, a processor 310, and/or a memory 350. In certain embodiments, some of the illustrated elements may be omitted or substituted. The electronic device 300 may further include at least some of the elements and/or functions of the electronic device 101 in FIG. 1. At least some of the respective illustrated (or not illustrated) elements of the electronic device 300 may be operatively, functionally, and/or electrically connected to each other.

The display 320 may display various images under the control of the processor 310.

The display 320 may be implemented with any one of, but is not limited to, a liquid crystal display (LCD), a light-emitting diode (LED) display, a micro LED display, a quantum dot (QD) display, or an organic light-emitting diode (OLED) display. The display 320 may be formed of a touch screen that senses a touch and/or proximity touch (or hovering) input using a user's body part (e.g., a finger) or an input device (e.g., a stylus pen). The display 320 may include at least a part of the configuration and/or function of the display module 160 in FIG. 1.

The display 320 may be flexible at least in part and may be implemented as a foldable display or a rollable display.

The communication module 330 may communicate with an external device through a wireless network under the control of the processor 310. The communication module 330 may include hardware and software modules for transmitting/receiving data to/from a cellular network (e.g., a long term evolution (LTE) network, a 5G network, a new radio (NR) network) and a short-distance network (e.g., Wi-Fi, Bluetooth). The communication module 330 may include at least a part of the configuration and/or function of the communication module 190 in FIG. 1.

The handwriting recognition module 340 may perform handwriting recognition (HWR) based on at least one stroke outputted on the display 320. According to an embodiment, the handwriting recognition module 340 may detect a pen tip of a pen-based pointing device and recognizes handwriting based on at least one of coordinate information, orientation, tilt, and pressure of the pen when the user handwrites. According to an embodiment, the handwriting recognition module 340 may learn handwriting data through deep learning or machine learning and convert the recognized handwriting into text.

In certain embodiments, the electronic device 300, can have a training phase, such as when the user sets up the electronic device 300 shortly after purchase. For example, the electronic device 300 can prompt the user to different predetermined letters.

The memory 350 may include a volatile memory (e.g., the volatile memory 132 in FIG. 1) and a non-volatile memory (e.g., the non-volatile memory 134 in FIG. 1) and store various kinds of data temporarily or permanently. The memory 350 may include at least a part of the configuration and/or function of the memory 130 in FIG. 1 and may store the program 140 in FIG. 1.

The memory 350 may store various instructions that can be executed by the processor 310. Such instructions may include control commands such as arithmetic and logical operations, data movement, or input/output that can be recognized by the processor 310.

The processor 310 may be operatively, functionally, and/or electrically connected to the respective elements (e.g., the display 320, the communication module 330, the handwriting recognition module 340, and the memory 350) of the electronic device 300 and may perform operations or data processing related to control and/or communication of the respective elements. The processor 310 may include at least a part of the configuration and/or function of the processor 120 in FIG. 1.

Although there will be no limitations to the operations and data processing functions that the processor 310 can implement in the electronic device 300, certain embodiments for recognizing overwrite-handwriting using the electronic device 300 will be described hereinafter. Operations of the processor 310 to be described later may be performed by loading instructions stored in the memory 350.

The processor 310 may receive a user's touch input and display an input stroke on the display 320. The processor 310 may detect a user's touch input to the display 320. The processor 310 may determine one area of the display 320 as a handwriting area and determine another area as an output area. The another area may be immediately adjacent to the left, when the handwriting is left to right. The processor 310 may output a stroke in the output area, based on a touch input to the writing area. According to an embodiment, the processor 310 may receive a touch input, but may not display an input stroke in the writing area. Based on the received touch input, the processor 310 may determine a corresponding character and output a stroke to the output area.

The processor 310 may analyze an input stroke and thereby determine a corresponding character. Using the handwriting recognition module 340, the processor 310 may select a character most similar to the input stroke. According to an embodiment, the processor 310 may select one character corresponding to a plurality of strokes. In order to recognize a character composed of a plurality of strokes, the processor 310 may insert a delay in stroke analysis. For example, there may be a case in which a first stroke and a second stroke constitute one character. When the first stroke is inputted, the processor 310 may determine a first temporary character corresponding to the first stroke. Thereafter, when the second stroke is inputted, the processor 310 may determine a second temporary character corresponding to the first and second strokes. The processor 310 can then determine whether the first temporary character forms a part of the second temporary character, or is distinct and separate from the second letter. For example, because the alphabet 'i' consists of two strokes, selecting a character corresponding to only one stroke may cause a recognition error. The processor 310 may determine 'l' as the first temporary character by analyzing the first stroke, and determine T as the second temporary character by analyzing the first and second strokes. In this case, the handwritten stroke that forms the 'l' also forms the T (the straight line forming the 'l' forms the bottom part of the 'i').

Because the first stroke and the second stroke constitute one character, the first temporary character and the second temporary character may be different characters. The processor 310 may deem the first temporary character, 'l', as a recognition error. Thereafter, when a third stroke is inputted, the processor 310 may determine a third temporary character corresponding to the first, second, and third strokes. In certain languages, the processor 310 may determine whether the second temporary character forms a part of the third character or is separate and distinct from the third temporary character. Because the second temporary character is one completed character composed of the first and second strokes, the third temporary character may include the second temporary character as it is. The processor 310 may determine that the second temporary character is handwritten, recognize the first and second strokes as one character, and output it in the output area.

Thereafter, when the third stroke is 'o', the processor 310 may determine 'io' as the third temporary character. In this case, because the second temporary character 'i' is separate and distinct from the third letter 'o', the processor 310 may recognize the alphabet 'i' as having been handwritten. The processor 310 may generate a stroke group including at least one stroke for which the corresponding character recognition has been completed. For example, in the above example, the first stroke and the second stroke (the bottom portion of the 'i' being the first stroke and the dot being the second stroke) may form one stroke group, and the third stroke (the circular stroke forming the 'o') may be included in another stroke group.

The processor 310 may generate a stroke index by using information on a stroke for which the character recognition has been completed. The processor 310 may generate a stroke index by assigning indexes to strokes in an inputted order and mapping a character corresponding to each stroke group with at least one stroke included in the corresponding stroke group. For example, if a first stroke, a second stroke, and a third stroke correspond to a first character, and if a fourth stroke and a fifth stroke correspond to a second character, the processor 310 may assign indexes to the first stroke, the second stroke, the third stroke, the fourth stroke, and the fifth stroke, respectively, in order. The processor 310 may generate a stroke index by mapping the first, second, and third strokes with the first character and mapping the fourth and fifth strokes with the second character.

The processor 310 may generate a recognition thread for a stroke group for which the character recognition has been completed, and output the corresponding stroke group in the output area. The processor 310 may output strokes, for which the character recognition has been completed, to the output area in units of stroke groups. The processor 310 may output a new stroke group to one side of the previously outputted stroke group. For example, the processor 310 may output a first stroke group corresponding to a first character in the output area, and sequentially output a second stroke group corresponding to a second character at one side (e.g., left or right) of the first stroke group. In order to arrange the output strokes so that the user can read them easily, the processor 310 may move the first stroke group to the left (or right) by one space and output the second stroke group in a region where the first stroke group was outputted. The processor 310 may determine an average size of the region occupied by the stroke group and move the first stroke group to one side by the corresponding size.

That is, the processor 310 detects temporary characters until another temporary character is detected that is detected. When detecting another temporary character that is separate and distinct, the first temporary character is deemed detected and moved to the left or right. For example, in the case of the user writing an T, the first stroke may be vertical line, which may be recognized as an 'l.' However, the second stroke may be a dot, and as a result, the second temporary letter is an 'i'. The vertical line initially recognized as an 'l' forms a portion of the T. However, the next stroke may be a circular stroke, recognized as an 'o'. Since the first and second stroke do not form a portion of the 'o', the T is deemed recognized and moved to the left. As another example, if the next line is a vertical line to the right of the 'o', the third and fourth strokes may be recognized as a 'd', and the 'o' is not deemed recognized. On the other hand, if the next stroke is a diagonal line forming an 'x', the letter 'o' is separate and distinct from the 'x', and the 'o' is deemed recognized.

The processor 310 may convert handwriting strokes corresponding to recognized character into text and output the text in the output area, while other handwriting strokes in the handwriting area. That is, in the above-described embodiment the processor 310 determines the character corresponding to at least some handwritten strokes, stores the stroke index, and output the input stroke as it was written, whereas in this embodiment the processor 310 outputs the text of the character corresponding to the stroke. Outputting the text of the character may be more legible, consumes less memory, and allows the user to immediately see the character the processor 310 recognizes from the handwriting, thereby allowing change in the case of error.

The processor 310 may establish a communication connection with an external device, using the communication module 330, and output a stroke group or text on the display 320 of the external device. When the display 320 of the electronic device 300 is relatively small, the processor 310 may output the recognized result on the display 320 of the external device for user convenience. For example, when the electronic device 300 is a smart watch, the processor 310 may establish a communication connection with an external device (e.g., a portable device) and output a stroke or text on the display 320 of the external device.

The processor 310 may reduce redundant operations by analyzing a stroke inputted through overwriting. Hereinafter, a method of improving a calculation speed by using a previously calculated score will be described. The processor 310 may generate a segment by bundling at least one stroke. The segment may be the minimum unit constituting a character. For example, when Korean handwriting is recognized, the segment may be a consonant or a vowel of each character. The processor 310 may generate a segment including at least one stroke. For example, the processor 310 may generate a consonant or vowel segment such as "ㅂ" or "ㅑ" by grouping at least one stroke.

The processor 310 may generate a template including at least one segment. The template may be a character candidate in which various numbers of consecutive segments are combined. For example, the processor 310 may generate a template set composed of one segment, a template set composed of two segments, and a template set composed of three segments. The template set may include at least one template composed of a predetermined number of consecutive segments. The processor 310 may determine the maximum number (e.g., 8) of segments that can be included in one template. According to an embodiment, depending on the type of a detected language, the processor 310 may determine the number of segments included in the template. For example, the number of segments included in the template may be increased when analyzing a first language in which the average length of words is relatively long, and the number of segments included in the template is reduced when analyzing a second language in which the average length of words is relatively short.

For example, the processor 310 may generate a first template including a first segment, a second template including a second segment, a third template including a third segment, a fourth template including the first and second segments, a fifth template including the second and third segments, and a sixth template including the first, second, and third segments.

The processor 310 may generate a character string candidate group composed of at least one template. The processor 310 may generate the character string candidate by combining templates so that all segments are included without duplicated segments. For example, the processor 310 may generate a character string candidate group that includes a first character string candidate composed of the first, second, and third templates, a second character string candidate composed of the first and fifth templates, a third character string candidate composed of the third and fourth templates, and a fourth character string candidate composed of the sixth template. The number of character string candidates included in the character string candidate group may vary depending on the maximum number of segments included in a template and the number of segments included in a word.

The processor 310 may calculate a score of each character string candidate. The processor 310 may calculate the score of each character string candidate, based on a predetermined algorithm including a multiple template classifier (MTC), a Gaussian mixture models (GMM), and/or a language model (LM). The MTC algorithm may compare a current template with template data previously learned through the handwriting recognition module 340 and thereby calculate a score based on a distance of similarity. The GMM algorithm may compare a current template with template data previously learned through the handwriting recognition module 340 and thereby calculate a score as to whether or not the current template is a character. The LM algorithm may perform comparison with language model data previously learned through the handwriting recognition module 340 and thereby calculate a score based on a probability between characters as a result of the MTC algorithm. The LM algorithm may measure the probability of correct handwriting recognition by considering a relationship between one character and the next consecutive character. Using at least one of the MTC algorithm, the GMM algorithm, and the LM algorithm, the processor 310 may determine a character most similar to an input stroke. The processor 310 may calculate the score of each template by using a predetermined algorithm, and finally calculate the score of a character string candidate by calculating (normalizing) the average of the scores of respective templates included in the character string candidate. In certain embodiments, the scoring may also factor in the prevalence of the candidate for the current character following the previous letter among words in the language of the writing The processor 310 may store the calculated score of the template in the memory 350 and use it when calculating the score of the same template in other character string candidate. For example, the first template may be included in both the first character string candidate and the second character string candidate. The processor 310 may calculate the score of the first template in the score calculation of the first character string candidate and store the calculated score in the memory 350. Thereafter, in the score calculation of the second character string candidate, the processor 310 may use the score of the first template stored in the memory 350 as it is. Thus, a process of calculating the score of the first template through the algorithm may be omitted, and the operation speed may be improved. As such, the processor 310 may repeatedly utilize the score of the template calculated once in subsequent calculations.

The processor 310 may select a character string candidate having the highest score and display a stroke in the output area. The processor 310 may calculate the scores of all templates and character string candidates by using the above-described method and select the character string candidate with the highest score.

The processor 310 may recognize a stroke by identifying a language. The processor 310 may control the handwriting recognition module 340 dependent on a language group and determine the language of an input stroke. After determining the language of the stroke, the processor 310 may perform a task for handwriting recognition. For example, when the alphabet 'k' is inputted, the processor 310 may generate a template for handwriting recognition after determining that the corresponding stroke is English.

Figure 4:
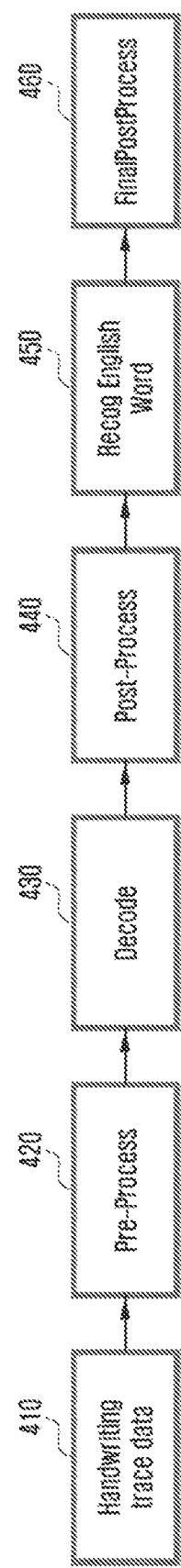
FIG. 4 is a flow diagram illustrating a method for performing handwriting recognition at an electronic device according to certain embodiments of the disclosure.

FIG. 4 is a flow diagram illustrating a method for performing handwriting recognition at an electronic device according to certain embodiments of the disclosure.

With reference to FIG. 4, a processor (e.g., the processor 310 in FIG. 3) may perform handwriting recognition by performing a handwriting input data receiving operation 410, a pre-processing operation 420, a decoding operation 430, a post-processing operation 440, an other language recognition operation 450, and/or a final post-processing operation 460. Hereinafter, respective operations will be described in detail.

In the handwriting input data receiving operation 410, the processor 310 may receive handwriting data inputted to a display (e.g., the display 320 in FIG. 3). The processor 310 may identify a contact point of a handwriting tool (e.g., a stylus, an electronic pen) on the display (e.g., the display 320 in FIG. 3) and output a stroke corresponding to a travel path on the display. The handwriting data may include information such as a stroke thickness, a stroke length, a pen pressure, a stroke tilt, a stroke orientation, and/or a distance between strokes.

In the pre-processing operation 420, the processor 310 may perform pre-processing for a reduction in several variations on handwriting and accurate classification. Depending on a user and a touch sensor (e.g., the sensor module 176 in FIG.

1), input data may be different even if the same character is handwritten. In the pre-processing operation 420, the processor 310 may correct a protrusion on handwriting, a handwriting size, a handwriting speed, and/or variations on tilt. For example, the protrusion on handwriting may occur at the moment the user starts or ends handwriting or in a situation where a momentary force is applied. The processor 310 may detect a start point of handwriting or a sudden change in pressure and correct the shape of a stroke by correcting the protrusion on handwriting. In addition, the size of the handwriting area may vary according to users, so that it may be required to correct variations on handwriting through normalization to the same size. Also, depending on a user's handwriting speed, the distribution of recognized coordinates (x coordinate and y coordinate) may vary. In order to reduce an interval difference between received coordinates, the processor 310 may perform a re-sampling process for making the interval between the coordinates of handwriting data constant. The processor 310 may correct a tilted character, based on handwriting data. According to an embodiment, in the pre-processing operation 420, the processor 310 may remove noise and convert the features of handwriting data into a more easily recognizable form. The processor 310 may remove a noise point of handwriting data, perform line segmentation, and perform skew correction.

In the decoding operation 430, the processor 310 may generate a character string candidate group and calculate a score. In the decoding operation 430, the processor 310 may generate segments, each of which is the minimum unit constituting a template, by combining at least one stroke, and generate a template using at least one segment. The processor 310 may generate a character string candidate composed of templates including various numbers of segments. The processor 310 may calculate a score to determine a character most similar to inputted handwriting data. In the decoding operation 430, the processor 310 may calculate a score using the MTC algorithm and the GMM algorithm.

In the post-processing operation 440, the processor 310 may add similar character candidates to extracted recognition target candidates or adjust template candidates by using geometric information. In addition, in the post-processing operation 440, the processor 310 may detect a list of words determined to be English. According to an embodiment, the processor 310 may calculate a score through the LM algorithm, based on the analysis result of handwriting data. The processor 310 may search a dictionary for a relationship between each character included in a character string and adjacent characters, thereby improving accuracy.

In the others language recognition operation 450, the processor 310 may re-recognize the list of detected English words with an English recognizer (e.g., a cursive handwriting recognition engine).

In the final post-processing operation 460, the processor 310 may change the final result of the recognized handwriting data, based on the geometrical characteristics of the handwriting input.

Figure 5:
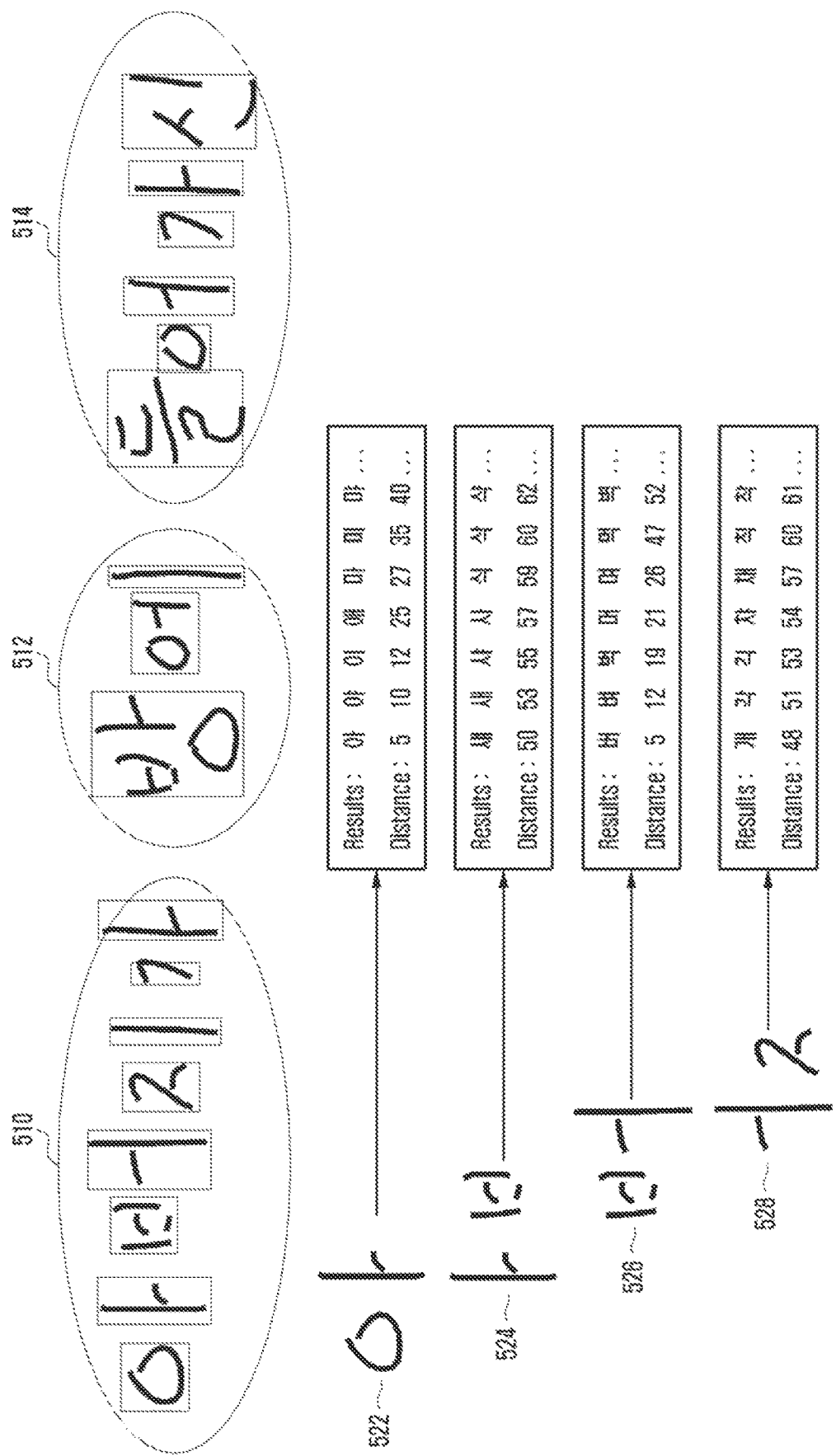
FIG. 5 illustrates a template constructed from recognized strokes by an electronic device, and a calculated score, according to certain embodiments of the disclosure.

FIG. 5 illustrates a template constructed from recognized strokes by an electronic device, and a calculated score, according to certain embodiments of the disclosure.

With reference to FIG. 5, a processor (e.g., the processor 310 in FIG. 3) may calculate a score for determining a character corresponding to at least one stroke. According to certain embodiments, the processor 310 may generate a segment including at least one stroke. The segment may be the minimum unit for the processor 310 to generate a template. For example, by combining strokes 510 corresponding to '아버지가' in units of segments, the processor may generate segments 'ㅇ', 'ㅏ', 'ㅂ', 'ㅓ', 'ㅈ', 'ㅣ', 'ㄱ', and 'ㅏ'.

The processor 310 may generate a template by combining at least one segment. The template may include one or more consecutive segments, and the number of segments included in one template may vary without limitation. For example, the processor 310 may generate all of a template set composed of one segment, a template set composed of two segments, and a template set composed of three segments. Similarly, in a situation where the strokes 510 corresponding to '아버지가' are inputted, the processor may generate templates such as '아', 'ㅏㅂ', '버', 'ㅓㅈ', '지', 'ㅣㄱ', '가', '아ㅂ', 'ㅏ버', 'ㅂㅈ', 'ㅓ지', '지ㄱ', and 'ㅣ가'. Among them, all templates except '아', '버', '지', and '가' are non-characters, but the processor 310 may learn both characters and non-characters to output the highest-scoring character as the final result.

The processor 310 may calculate a score of the template, based on a predetermined algorithm. The processor 310 may find similar characters by inputting the generated template into a predetermined algorithm (e.g., MTC, GMM, or LM). For example, the processor 310 may generate a first template 522 '아', a second template 524 'ㅏㅂ', a third template 526 '버', and a fourth template 528 'ㅓㅈ'. When each template is substituted into the algorithm, the first template 522 may be calculated to have higher similarities with characters such as '아', '야', and '이', the second template 524 may be calculated to have higher similarities with characters such as '새', '세', and '사', the third template 526 may be calculated to have higher similarities with characters such as '버', '베', and '빅', and the fourth template 528 may be calculated to have higher similarities with characters such as '개', '각', and '긱'. Among them, the first template 522 and the third template 526 are calculated to have significantly higher similarities with characters, whereas the second template 524 and the fourth template 528 are calculated to have lower similarities with characters which even have the highest similarity. Therefore, the processor 310 may determine the first template 522 and the third template 526 as real characters.

For strokes corresponding to '방에' 512 and '들어가신' 514, the processor 310 may calculate a score based on a predetermined algorithm (e.g., MTC, GMM, or LM) and determine the character with the highest similarity. Hereinafter, in FIG. 6, a method for recognizing handwriting data for all strokes will be described.

Figure 6:
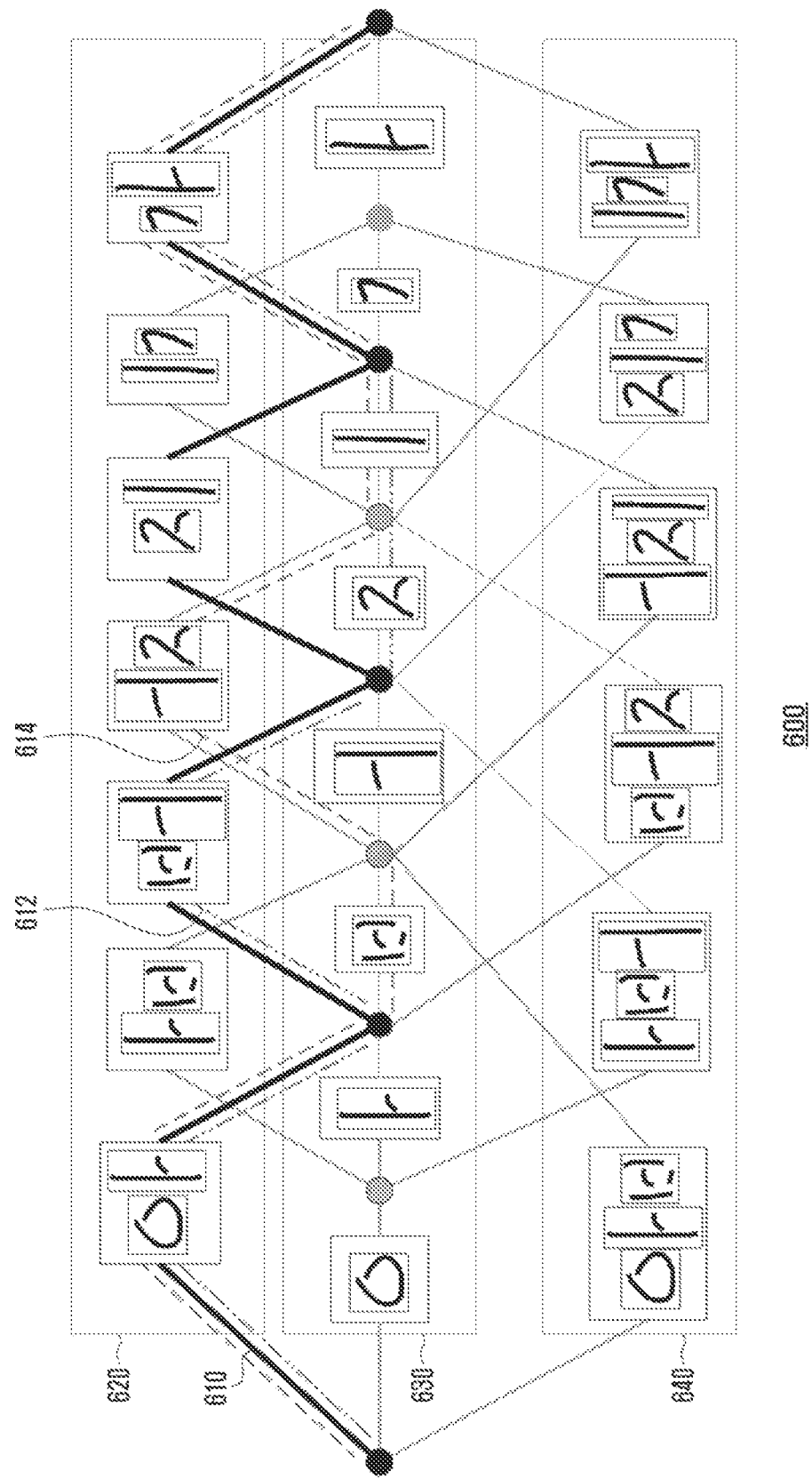
FIG. 6 illustrates that an electronic device generates a character string candidate group with various templates and selects an optimal path according to certain embodiments of the disclosure.

FIG. 6 illustrates that an electronic device generates a character string candidate group with various templates and selects an optimal path according to certain embodiments of the disclosure.

The top row 620 includes template pairs, the second row 630 includes single templates, and the third row 640 includes groups of three templates. The pairs in row 620 and groups in the third row 640 are staggered one template at a time.

With reference to FIG. 6, a processor (e.g., the processor 310 in FIG. 3) may generate at least one character string candidate by using various generated templates. In FIG. 6, templates composed of the same number of segments may be positioned in the same row. For example, the template arranged in a first row 620 is a template composed of two segments, the template arranged in a second row 630 is a template composed of one segment, and the template arranged in a third row 640 is a template composed of three segments.

The processor can score each possible grouping of the templates in combinations of one, two, and three. According to various embodiments, the processor 310 may generate at least one path 600 connecting templates so that all segments are included without duplicated segments, and calculate a score of each path 600. FIG. 6 illustrates paths 600 each of which connects templates so that all segments are included without duplication. The processor 310 may normalize the scores of all templates included in one path and thereby calculate the score of that path. For example, if templates belonging to a first path 612 are '아', '베', 'ㅈ', 'ㅣ', and '가', the processor 310 may calculate the scores of respective templates, and calculate the score of the first path 612 by normalizing the scores of respective templates.

According to certain embodiments, the processor 310 may utilize the score of a template calculated in one path when calculating in another path. To this end, the processor 310 may store the score of a template calculated once in a memory (e.g., the memory 350 in FIG. 3). For example, templates included in a first path 612 may be '아', '베', 'ㅈ', 'ㅣ', and '가', and templates included in a second path 614 may be '아', 'ㅐ', 'ㅓㅈ', 'ㅣ', and '가'. The processor 310 may store the scores of all templates calculated in the first path 612 in the memory. Thereafter, when calculating the scores in the second path 614, the processor may acquire the scores of templates '아', 'ㅣ', and '가' overlapping with those of the first path 612 from the memory and use them without calculation. Through this, the score calculation speed of the processor 310 may be improved.

According to certain embodiments, the processor 310 may select a path 610 having the highest score among the calculated scores of the paths 600. The processor 310 may output the templates included in the selected path 610 to the output area. For example, the processor may select four templates '아', '베', '지', and '가' connected by a thick line 610 shown in FIG. 6 and determine a character corresponding to such selected handwriting data.

In certain embodiments, the electronic device can start with a single template. If the single template appears sufficiently like a character, the single template is deemed that character and the next template is examined as a single template. If the single template does not appear sufficiently like a character, the electronic device can add the second template. The electronic device can determine if the paired templates sufficiently appear like a character. If so, the pair is deemed character and the next character is examined as a singular character. If the template pair does not sufficiently appear like a character, the next template is examined with the first two templates.

Figure 7A:
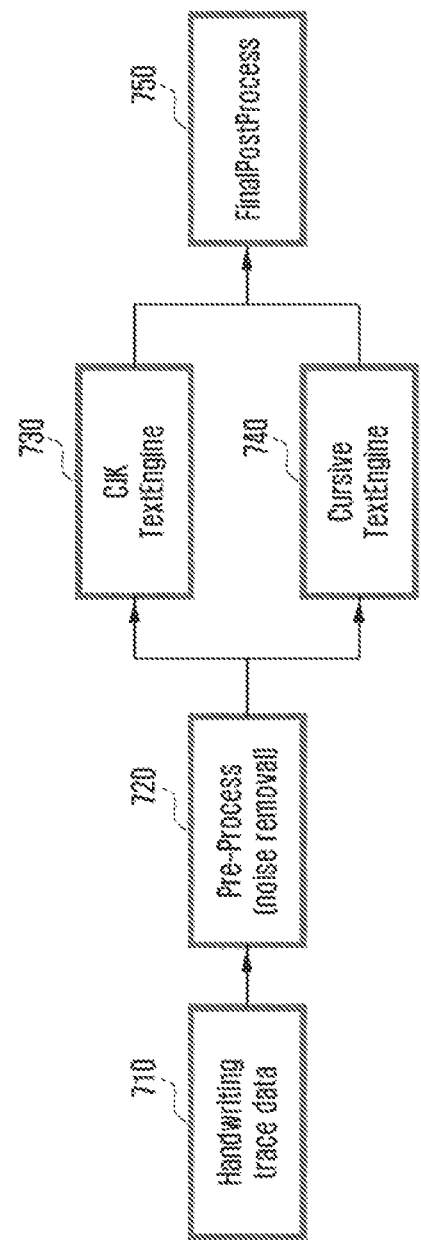
FIG. 7A illustrates a handwriting recognition module of an electronic device according to certain embodiments of the disclosure.

FIG. 7A illustrates a handwriting recognition module of an electronic device according to certain embodiments of the disclosure.

Figure 7B:
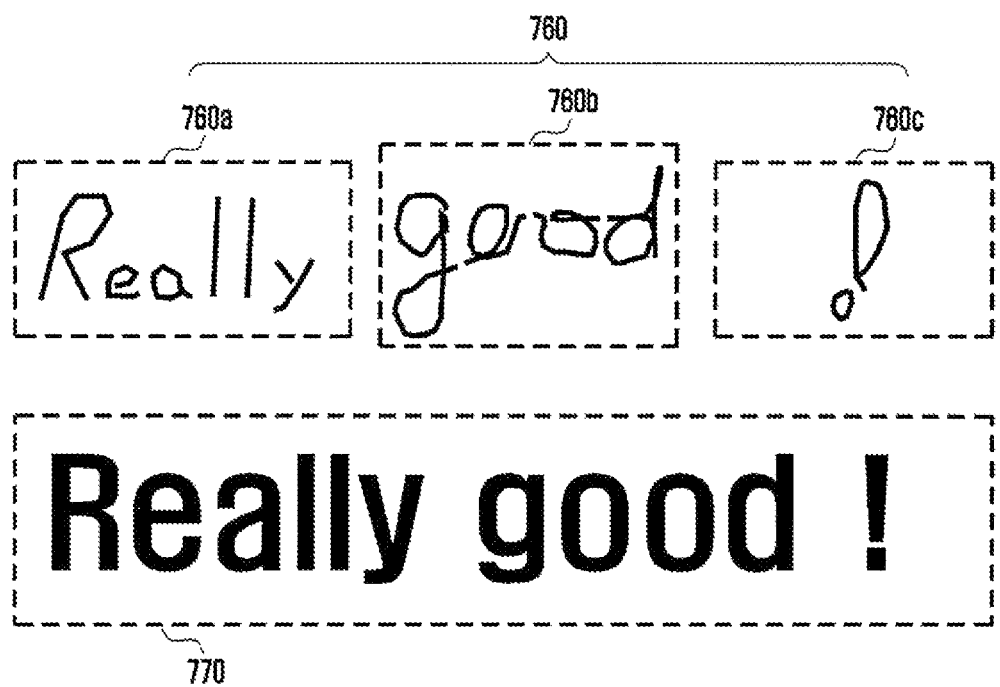
FIG. 7B illustrates a screen on which an electronic device recognizes handwriting including different languages according to certain embodiments of the disclosure.

FIG. 7B illustrates a screen on which an electronic device recognizes handwriting including different languages according to certain embodiments of the disclosure.

FIG. 7A shows an internal algorithm for a handwriting recognition module (e.g., the handwriting recognition module 340 in FIG. 3) to recognize handwriting by distinguishing different languages. According to certain embodiments, the handwriting recognition module may include a Chinese Japanese Korean (CJK) text engine 730 and a cursive text engine 740 (English). A handwriting input data receiving operation 710 (e.g., the handwriting input data receiving operation 410 in FIG. 4), a pre-processing operation 720 (e.g., the pre-processing operation 420 in FIG. 4), and a final post-processing operation 750 (e.g., the final post-processing operation 460 in FIG. 4), performed by the handwriting recognition module to recognize handwriting data, are the same as those described above with reference to FIG. 4, so their descriptions will be omitted.

The processor (e.g., the processor 310 in FIG. 3) may detect different languages by using the CJK text engine 730 and the cursive text engine 740. The CJK text engine 730 may detect Chinese, Japanese, and Korean, and the cursive text engine 740 may detect other languages. The processor 310 may analyze handwriting data, send handwriting data including at least one language among Chinese, Japanese, and Korean to the CJK text engine 730, and send handwriting data including other languages to the cursive text engine 740. Each text engine may analyze text by performing line segmentation, feature extraction, and post-processing. According to an embodiment, the CJK text engine 730 may further include an English word detection module (not shown). The English word detection module may detect English from handwriting data transmitted to the CJK text engine 730 and, when English is detected, send the handwriting data to the cursive text engine 740.

Depending on the type of inputted handwriting, the CJK text engine 730 may recognize it by itself or allow the cursive text engine 740 to recognize it. For example, if the English word 'cat' is inputted in cursive letters (i.e., characters are connected), the CJK text engine 730 does not recognize it and transmits the handwriting data to the cursive text engine 740. However, if the 'cat' is inputted in block letters (i.e., characters are spaced out), the CJK text engine 730 may also analyze it and determine that it corresponds to the character 'cat'.

FIG. 7B shows an embodiment of analyzing handwriting data by using the CJK text engine 730 and the cursive text engine 740. In FIG. 7B, the first handwriting data 760 includes both Korean and cursive English strokes, and the second handwriting data 770 includes both Korean and block English strokes. In the first handwriting data 760, '정말' 760a and '이요' 760c are Korean strokes, and 'good' 760b with letters connected is a cursive English stroke. Therefore, in order to analyze the text, the processor 310 may transmit '정말' 760a and '이요' 760c to the CJK text engine 730 and transmit 'good' 760b to the cursive text engine 740. On the other hand, in case of the second handwriting data 770, all of the Korean strokes '정말' and '이요' and the block English stroke 'good' with letters spaced may be transmitted to the CJK text engine 730 to perform handwriting recognition.

Figure 8A:
FIGS. 8A and 8B illustrate screens on which an electronic device outputs a stroke or text to an external device according to certain embodiments of the disclosure.
Figure 8B:

FIGS. 8A and 8B illustrate screens on which an electronic device outputs a stroke or text to an external device according to certain embodiments of the disclosure. It is noted that due to the smaller size of electronic device 800, it is difficult to write entire words from left to write. Accordingly, the user can write each of the individual characters over the screen of the electronic device 800. When the character is recognized, the character is shown on electronic device 810 with a larger display, along with the previously recognized characters.

According to certain embodiments, a processor (e.g., the processor 310 in FIG. 3) may establish a communication connection with an external device 810 and output a handwriting recognition result on a display (e.g., the display 320 in FIG. 3) of the external device 810. With reference to FIG. 8A, the processor 310 may transmit stroke information inputted to an electronic device 800 (e.g., the electronic device 300 in FIG. 3) to the external device 810 to output. For example, the processor 310 may transmit an input stroke 802 recognized by the electronic device 800 to the external device 810. The processor 310 may generate a stroke index by analyzing the input stroke 802 and transmit information on the input stroke 802 to the external device 810 to output it on the display of the external device 810. According to an embodiment, a stroke 812a or 812b outputted by the external device 810 may be different in size from the stroke 802 inputted to the electronic device 800.

The processor 310 may transmit text information of a character corresponding to the analyzed handwriting data to the external device 810. The external device 810 may output text 812b instead of the input stroke 802. With reference to FIG. 8B, the processor 310 that recognizes the stroke 802 corresponding to the alphabet 'g' from a user input may output the text 'g' 812b on the external device 810.

According to certain embodiments, an electronic device may include a display, a memory, and a processor operatively connected to the display and the memory. The processor may be configured to, while receiving user's touch input in a handwriting area of the display, the user's touch input comprising successive input stokes: output the successive input strokes in the handwriting area on the display; determine a first stroke group including some of the successive input strokes, to determine a first character corresponding to the first stroke group, to output the first stroke group in an output area adjacent to the handwriting area on the display, to determine a second stroke group including at least another input stroke received after the some of the successive input strokes, to determine a second character corresponding to the second stroke group, and to output the second stroke group in the output area, move the first stroke group to on one side of the second stroke group on the display.

According to certain embodiments, the electronic device may further include a handwriting recognition module, and the processor may generate a template including at least one input stroke of the successive input strokes, extract a character corresponding to the template by using the handwriting recognition module, calculate a score indicating similarity between the template and the character, and store the calculated score in the memory after mapping the score to the template.

According to certain embodiments, the processor may use the score stored in the memory when a score corresponding to the template is needed to determine a character corresponding to a stroke group.

According to certain embodiments, the processor may generate a segment, which is a minimum unit constituting the template, by combining at least one stroke.

According to certain embodiments, the processor may generate at least one template by combining a predetermined number of consecutive segments.

According to certain embodiments, the processor may generate at least one character string candidate including at least one template, and calculate a score of the character string candidate, based on the score of the template included in each character string candidate.

According to certain embodiments, calculating the score includes using at least one of a multiple template classifier (MTC), a Gaussian mixture models (GMM), or a language model (LM).

According to certain embodiments, the processor may output a first text corresponding to the first character or a second text corresponding to the second character.

According to certain embodiments, the electronic device may further include a communication module, and the processor may establish a communication connection with an external device by using the communication module, and display a stroke group or a character on a display of the external device.

According to certain embodiments, the processor may assign an index to at least one input stroke of the successive input strokes in an inputted order, and generate a stroke index by mapping a character corresponding to each stroke group and at least one input stroke included in the stroke group.

According to certain embodiments, the processor may generate a recognition thread for each stroke group, based on the stroke index, and output each stroke group or shift a position, based on the recognition thread.

According to certain embodiments, the processor may recognize an input stroke of the successive input strokes by identifying a language.

According to certain embodiments, wherein the output area is left of the handwriting area.

Figure 9:
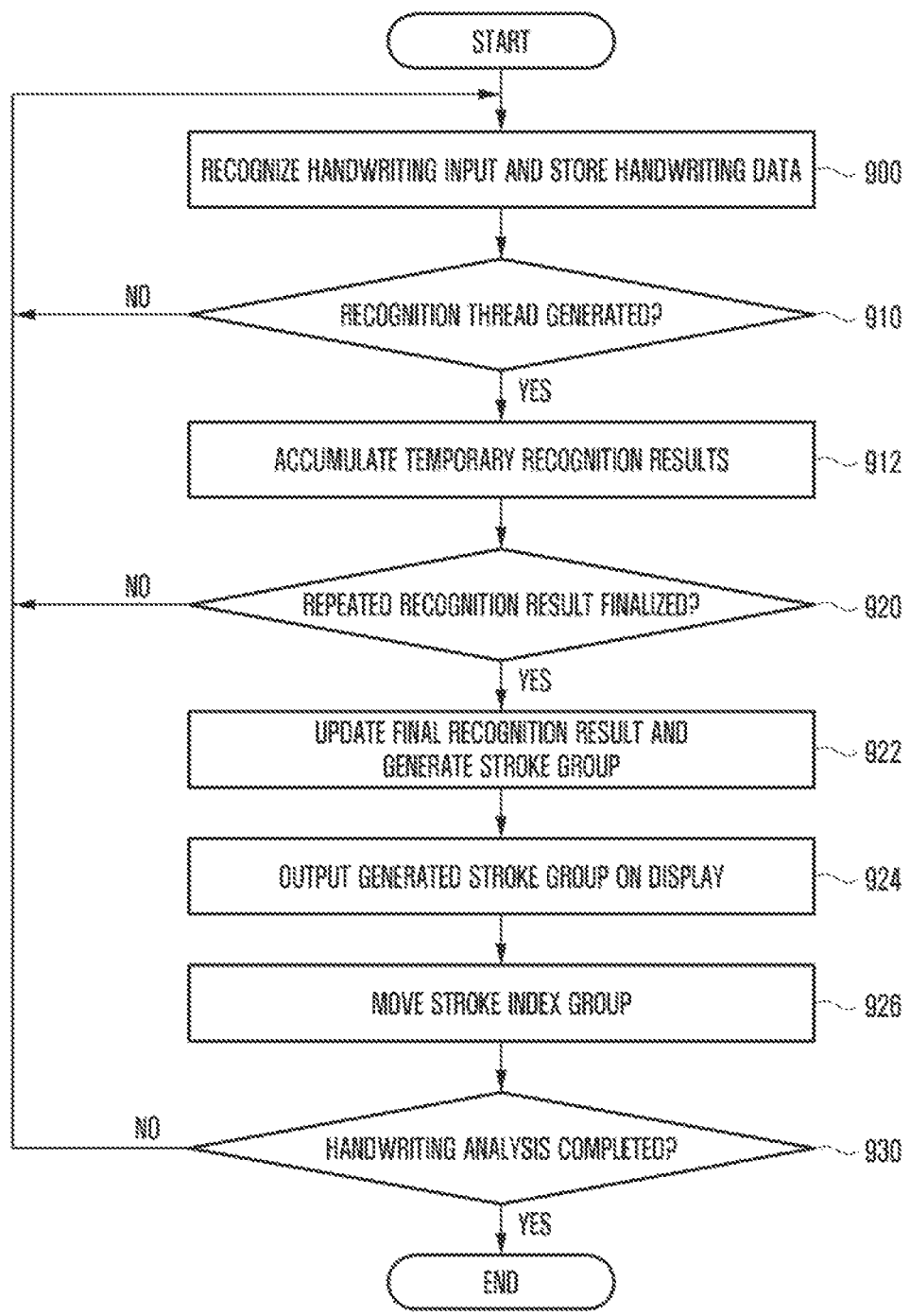
FIG. 9 is a flow diagram illustrating a method for recognizing handwriting at an electronic device according to certain embodiments of the disclosure.

FIG. 9 is a flow diagram illustrating a method for recognizing handwriting at an electronic device according to certain embodiments of the disclosure.

The method shown in FIG. 9 may be performed by the electronic device described with reference to FIGS. 1 to 8 (e.g., the electronic device 101 in FIG. 1, the electronic device 300 in FIG. 3, and the electronic device 800 in FIG. 8), and the description of the technical features described above will be omitted below.

At operation 900, the electronic device may recognize a handwriting input and store handwriting data. The electronic device may detect a user's touch input to a display (e.g., the display 320 in FIG. 3). The electronic device may determine one area of the display as a handwriting area (for example, FIG. 2A, 204) and determine another area as an output area (for example, FIG. 2A, 202). The electronic device may output a stroke in the output area, based on a touch input to the handwriting area. According to an embodiment, the electronic device may receive a touch input, but may not display an input stroke in the handwriting area. The electronic device may determine a corresponding character based on the received touch input and output a stroke in the output area.

The electronic device may generate a stroke index by using information on a stroke for which character recognition has been completed. The electronic device may generate a stroke index by assigning an index to each stoke in the order of input and mapping a character corresponding to each stroke group with at least one stroke included in the corresponding stroke group.

At operation 910, the electronic device may determine whether to generate a recognition thread (such as shown in FIG. 6). When the inputted handwriting data is identified as a character, the electronic device may generate the recognition thread. The generated recognition thread may be changed before it is finalized as a stroke group.

At operation 912, the electronic device may accumulate temporary recognition results. While continuously receiving the input strokes, the electronic device may determine whether the recognition thread continuously represents the recognition of the same character.

At operation 920, when the recognition result is repeated, the electronic device may finalize the temporary recognition result. The electronic device may determine that the stroke included in the finalized recognition result corresponds to one character.

According to certain embodiments, at operation 922, the electronic device may update the final recognition result and generate a stroke group. The stroke group generated by the electronic device may correspond to one character. The electronic device may generate a stroke index by assigning an index to each stoke in the order of input and mapping a character corresponding to each stroke group with at least one stroke included in the corresponding stroke group.

According to certain embodiments, at operation 924, the electronic device may output the generated stroke group in the output area. The electronic device may output a new stroke group to one side of the previously outputted stroke group. According to an embodiment, in order to arrange the output strokes so that the user can read them easily, the electronic device may move the first stroke group to the left (or right) by one space and output the second stroke group in a region where the first stroke group was outputted. According to another embodiment, the electronic device may convert a character corresponding to the recognized stroke into text and output the text, not the stroke, to the output area.

According to certain embodiments, the electronic device may establish a communication connection with an external device (e.g., the external device 810 in FIG. 8) by using a communication module (e.g., the communication module 330 in FIG. 3) and output a stroke group or text on a display of the external device. When a display of the electronic device is relatively small, the electronic device may output the recognized result on the display of the external device for user convenience.

According to certain embodiments, at operation 926, the electronic device may move the stroke index group. That is, after determining all strokes corresponding to one character, the electronic device may shift the index group to recognize the next character.

According to certain embodiments, at operation 930, the electronic device may determine whether the handwriting input is terminated. The electronic device may determine whether analysis of all inputted handwriting data has been completed, and if data to be analyzed remains, may generate a recognition thread for the corresponding stroke.

FIG. 10 is a flow diagram illustrating a method for generating a character string candidate group with various templates and selecting an optimal path at an electronic device according to certain embodiments of the disclosure.

According to certain embodiments, at operation 1000, the electronic device may recognize a handwriting input. The handwriting input may include at least one stroke. The electronic device may generate a segment by bundling at least one stroke. The segment may be the minimum unit constituting a template.

According to certain embodiments, at operation 1002, the electronic device may generate a template composed of at least one segment. The template may be a character candidate in which various numbers of consecutive segments are combined. A template set may include at least one template composed of a predetermined number of consecutive segments. The electronic device may determine the maximum number (e.g., 8) of segments that can be included in one template. According to an embodiment, depending on the type of a detected language, the electronic device may determine the number of segments included in the template.

According to certain embodiments, the electronic device may generate a character string candidate group composed of at least one template. The electronic device may generate the character string candidate by combining templates so that all segments are included without duplicated segments. The electronic device may calculate a score of each character string candidate. The electronic device may calculate the score of each character string candidate, based on a predetermined algorithm including the MTC, the GMM, and/or the LM.

According to certain embodiments, at operation 1010, the electronic device may determine whether a score of a current template exists in a memory (e.g., the memory 350 in FIG. 3). The electronic device may store a calculated score of a template in the memory and use it when calculating the score of the same template in other character string candidates.

According to certain embodiments, if the score of the current template exists in the memory, the electronic device may move at operation 1012 to the next template without calculating the score of the current template.

According to certain embodiments, if the score of the current template does not exist in the memory, the electronic device may calculate the score of the current template at operation 1014. Using at least one of the MTC algorithm, the GMM algorithm, and the LM algorithm, the electronic device may determine a character most similar to an input stroke. The electronic device may calculate the score of each template by using a predetermined algorithm, and finally calculate the score of a character string candidate by calculating (normalizing) the average of the scores of respective templates included in the character string candidate.

According to certain embodiments, at operation 1020, the electronic device may determine whether score calculation of all templates is completed. The electronic device may calculate scores of all generated templates and scores of paths including the templates.

According to certain embodiments, at operation 1030, the electronic device may select a template included in a path having the highest score, and output a stroke included in the selected template in the output area.

According to certain embodiments, a method for recognizing handwriting in an electronic device may include while receiving user's touch input in a handwriting area of a display, the user's touch input comprising successive input strokes: outputting the successive input strokes in the handwriting area on the display; determining a first stroke group including some of the successive input strokes, determining a first character corresponding to the first stroke group, outputting the first stroke group in an output area adjacent to the handwriting area on the display, determining a second stroke group including at least another input received after the some of the successive input strokes, determining a second character corresponding to the second stroke group, and outputting the second stroke group in the output area; and moving the first stroke group to one side of the second stroke group on the display.

According to certain embodiments, determining a character corresponding to each stroke group may further include generating a template including at least one input stroke of the successive input strokes, extracting a character corresponding to the template by using a handwriting recognition module, calculating a score indicating similarity between the template and the character, and storing the calculated score in a memory after mapping the score to the template.

According to certain embodiments, determining a character corresponding to each stroke group may further include using the score stored in the memory when a score corresponding to the template is needed to determine a character corresponding to a stroke group.

According to certain embodiments, determining a character corresponding to each stroke group may further include generating at least one character string candidate including at least one template, and calculating a score of the character string candidate, based on the score of the template included in each character string candidate.

According to certain embodiments, the method may further include outputting a first text corresponding to the first character or a second text corresponding to the second character.

According to certain embodiments, outputting each stroke group on a display may further include assigning an index to at least one stroke in an inputted order, and generating a stroke index by mapping a character corresponding to each stroke group and at least one stroke included in the stroke group.

According to certain embodiments, outputting each stroke group on a display may further include generating a recognition thread for each stroke group, based on the stroke index, and outputting each stroke group or shift a position, based on the recognition thread.

The embodiments of the disclosure disclosed in this specification and drawings are provided merely to propose specific examples in order to easily describe the technical features according to the embodiments of the disclosure and to help understanding of the embodiments of the disclosure, and are not intended to limit the scope of the embodiments of the disclosure. Accordingly, the scope of the certain embodiments of the disclosure should be construed in such a manner that, in addition to the embodiments disclosed herein, all changes or modifications derived from the technical idea of the certain embodiments of the disclosure are included in the scope of the certain embodiments of the disclosure.

The invention claimed is:

1. An electronic device comprising:
a display;
a memory; and
a processor operatively connected to the display and the memory,
wherein the processor is configured to:
   determine a first stroke group including at least one input stroke upon receiving a user's touch input,
   determine a first character corresponding to the first stroke group,
   output the first stroke group in an output area adjacent to a handwriting area on the display,
   determine a second stroke group including at least another input stroke received after the some of a successive input strokes,
   determine a second character corresponding to the second stroke group, and
   output the second stroke group on one side of the previously outputted first stroke group.

2. The electronic device of claim 1, further comprising:
a handwriting recognition module,
wherein the processor is configured to:
generate a template including at least one input stroke of the successive input strokes,
extract a character corresponding to the template using the handwriting recognition module,
calculate a score indicating similarity between the template and the character in accordance, and
store the calculated score in the memory after mapping the score to the template.

3. The electronic device of claim 2, wherein the processor is configured to:
use the score stored in the memory when a score corresponding to the template is needed to determine a character corresponding to a stroke group.

4. The electronic device of claim 2, wherein the processor is configured to:
generate a segment, which is a minimum unit constituting the template, by combining at least one stroke.

5. The electronic device of claim 4, wherein the processor is configured to:
generate at least one template by combining a predetermined number of consecutive segments.

6. The electronic device of claim 2, wherein the processor is configured to:
generate at least one character string candidate including at least one template, and
calculate a score of the at least one character string candidate, based on the score of the template included in each character string candidate.

7. The electronic device of claim 2, calculating the score includes using at least one of a multiple template classifier (MTC), a Gaussian mixture models (GMM), or a language model (LM).

8. The electronic device of claim 1, wherein the processor is configured to:
output a first text corresponding to the first character or a second text corresponding to the second character.

9. The electronic device of claim 1, further comprising:
a communication module,
wherein the processor is configured to:
establish a communication connection with an external device by using the communication module, and
display a stroke group or a character on the display of the external device.

10. The electronic device of claim 1, wherein the processor is configured to:
assign an index to at least one input stroke of the successive input strokes in an inputted order, and
generate a stroke index by mapping a character corresponding to each stroke group and at least one input stroke included in each stroke group.

11. The electronic device of claim 10, wherein the processor is configured to:
generate a recognition thread for each stroke group, based on the stroke index, and output each stroke group or shift a position, based on the recognition thread.

12. The electronic device of claim 1, wherein the processor is configured to:
recognize an input stroke of the successive input strokes by identifying a language.

13. The electronic device of claim 1, wherein the output area is left of the handwriting area on the display.

14. A method for recognizing handwriting in an electronic device, the method comprising:
while receiving user's touch input in a handwriting area of a display, the user's touch input comprising successive input strokes:
   outputting the successive input strokes in the handwriting area on the display;
   determining a first stroke group including some of the successive input strokes;
   determining a first character corresponding to the first stroke group;
   outputting the first stroke group in an output area adjacent to the handwriting area on the display;
   determining a second stroke group including at least another input received after the some of the successive input strokes;

determining a second character corresponding to the second stroke group; and outputting the second stroke group in the output area; moving the first stroke group to one side of the second stroke group on the display.

15. The method of claim 14, wherein determining a character corresponding to each stroke group further comprises:

generating a template including at least one input stroke of the successive input strokes, extracting a character corresponding to the template by using a handwriting recognition module, calculating a score indicating similarity between the template and the character, and storing the calculated score in a memory after mapping the score to the template.

16. The method of claim 15, wherein determining the character corresponding to each stroke group further comprises:

using the score stored in the memory when a score corresponding to the template is needed to determine a character corresponding to a stroke group.

17. The method of claim 15, wherein determining a character corresponding to each stroke group further comprises:

generating at least one character string candidate including at least one template, and calculating a score of the at least one character string candidate, based on the score of the template included in each character string candidate.

18. The method of claim 14, further comprising:

outputting a first text corresponding to the first character or a second text corresponding to the second character.

19. The method of claim 14, wherein outputting each stroke group on a display further comprises:

assigning an index to at least one stroke in an inputted order, and generating a stroke index by mapping a character corresponding to each stroke group and at least one stroke included in the stroke group.

20. The method of claim 19, wherein outputting each stroke group on a display further comprises:

generating a recognition thread for each stroke group, based on the stroke index, and outputting each stroke group or shift a position, based on the recognition thread.

* * * * *